2,957,918

PHENYLCYCLOBUTENEDIONE AND PROCESS OF PREPARATION

Edgar J. Smutny, Berkeley, and John D. Roberts, Altadena, Calif., assignors to California Institute Research Foundation, Pasadena, Calif., a corporation of California No Drawing. Filed June 1, 1956, Ser. No. 588,621

3 Claims. (Cl. 260—590)

This invention relates to a series of new compounds and particularly to a series of cyclobutenedione derivatives and a method for their preparation.

One of the principal objects of this invention is to provide a series of new compounds having a four-carbon monocyclic ring system.

Another object of this invention is to provide a series of oxygenated phenylcyclobutenediones.

A further object of this invention is to provide an oxygenated phenylcyclobutene which is active in vitro against E. histolytica and M. tuberculosis and active in vivo against intestinal amebiasis in rats.

A more specific object of this invention is to provide a derivative of phenylcyclobutenedione which is a strong organic acid.

Briefly, this invention comprises a series of new compounds having a 4-membered ring system and a method for their preparation. More specifically, the invention comprises a method of preparing the new compound phenylcyclobutenedione, and a series of derivatives thereof.

It has been discovered that phenylcyclobutenedione is toxic to amoeba but is tolerated by animals. It may, therefore, be used as a disinfectant or toxin. A derivative of the dione, 4-hydroxy-3-phenylcyclobutenedione is a strong organic acid and may be used in reactions where standard inorganic acids would be harmful. The halide and methoxy derivatives of the dione are unstable in water, reacting with water to form 4-hydroxy-3-phenylcyclobutenedione. These compounds are useful in organic reactions requiring carefully controlled acidification.

The general method of preparing these compounds consists of reacting phenylacetylene with a halogen-saturated ethylene as, for example, trifluorochloroethylene, or tetrafluoroethylene, to give the halogen-substituted phenylcyclobutene, hydrolyzing these cyclo compounds with sulfuric acid which gives phenylcyclobutenedione, and preparing derivatives of this new compound by appropriate chemical means.

The following is a specific example of one process by which phenylcyclobutenedione may be prepared.

PREPARATION OF PHENYLCYCLOBUTENE DIONE

A reaction bomb in the form of a sealable tube was flushed with nitrogen to eliminate oxygen and water vapor. Trifluorochloroethylene was dried and condensed at −45° C. in phenylacetylene. 30 grams (.29 mole) of dry phenylacetylene and 34.2 grams (.29 mole) of trifluorochloroethylene were introduced into the bomb, the bomb sealed and heated at 100° C. for 11 hours and at 125° C. for 20 hours. The resulting crude product was distilled under reduced pressure to eliminate some polymeric material and the resulting distillate was then fractionated through a 3½ foot vigreaux column. The resultant compound was 1,1,2-trifluoro-2-chloro-3-phenylcyclobutene and the yield was 50.8 grams which represented approximately 79%. The boiling point of this compound at 0.4 mm. was 52–54° C. Analysis of this compound showed:

Calculated for $C_{10}H_6F_3Cl$: C, 54.92; H, 2.77. Found: C, 5483; H, 2.89.

Five grams of the 1,1,2-trifluoro-2-chloro-3-phenylcyclobutene was added to 20 ml. of 90–92% sulfuric acid which has been preheated on a steam cone. Hydrogen halide evolution began at once. The mixture was heated mechanically, stirred for 20 minutes and then immediately quenched by pouring into an ice-water slurry. The resulting precipitate was filtered, washed with water and crystallized from acetone. 3.1 grams of this precipitant, representing a yield of 88%, was recovered. The melting point of this precipitate, after crystallization, was 149–152° C. At this temperature the compound decomposed. The precipitate as crystallized from acetone was sublimed and recrystallized to provide an analytical sample. The estimated melting point of this sample was 152.4–153.2° C. (with decomposition). Analysis of this sample showed it to be phenylcyclobutenedione. This structure was established in the following manner:

Microanalysis and molecular weight measurements suggested an emperical formula of $C_{10}H_6O_2$.

Calculated for $C_{10}H_6O_2$: C, 75.94; H, 3.82. Found: C, 76.00; H, 3.85.
Molecular weight for $C_{10}H_6O_2$, calculated: 1.58.15. Found: 151.

Oxidation of 106 mg. of phenylcyclobutenedione in acetone with sodium permanganate gave, after destruction of the manganese dioxide with bisulfite, 48 mg. of benzoic acid which was identified by melting point and mixed melting point with an authentic sample. Reaction of the phenylcyclobutenedione with 30% hydrogen peroxide in chloroform led to phenylmaleic anhydride which was identical in all respects with an authentic sample. This type of oxidative cleavage reaction serves as a characterization test of α-diketones and would eliminate from consideration any naphthalene derivatives. Reduction of the dione with amalgamated zinc and hydrochloric acid produced phenylcyclobutane whose infrared spectrum was identical to an authentic sample previously prepared. Consequently only the phenylcyclobutenedione structure satisfactorily fits all the experimental data.

The following illustrates the preparation of the dione and the proof of its structure:

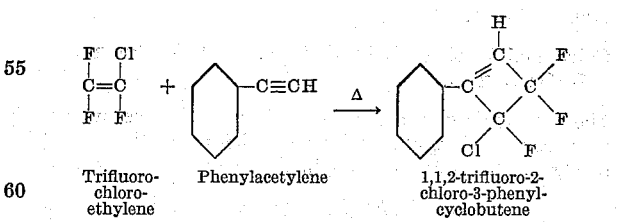

Trifluoro-chloroethylene    Phenylacetylene    1,1,2-trifluoro-2-chloro-3-phenylcyclobutene

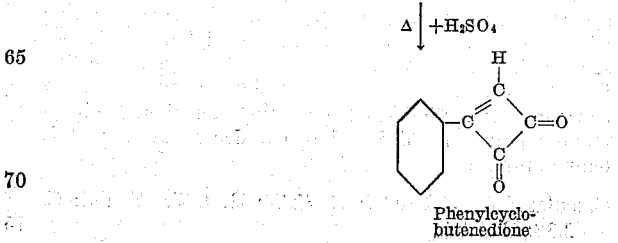

Phenylcyclobutenedione

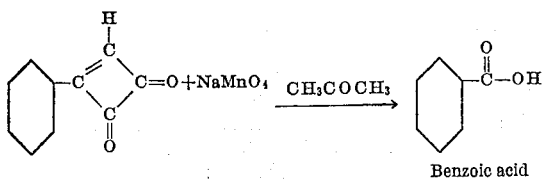

Benzoic acid

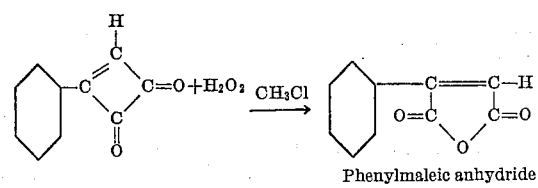

Phenylmaleic anhydride

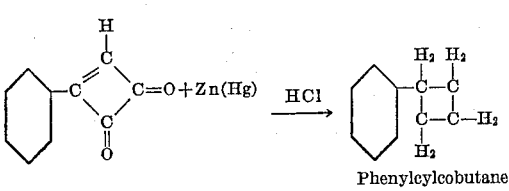

Phenylcylcobutane

PREPARATION OF DERIVATIVES OF PHENYLCYCLOBUTENEDIONE

4-chloro-3-phenylcyclobutenedione

One gram of phenylcyclobutenedione was dissolved in 15 ml. of glacial acetic acid and dried chlorine gas passed through the solution for 15 minutes. On cooling this solution a crop of lemon-yellow crystals separated which were removed by filtration. Evaporation of the mother liquor at reduced pressure yielded further crystals. The original filtrate and that isolated from the mother liquor were recrystallized from carbon tetrachloride and were identified as 4-chloro-3-phenylcyclobutenedione. The melting point of this compound was 113.8–114.8° C. Analysis of this compound showed:

Calculated for $C_{10}H_5O_2Cl$: C, 62.36; H, 2.62. Found: C, 62.20; H, 2.54.

The chlorodione gave an immediate precipitate with silver nitrate, decolorized permanganate, reacted with sodium iodide in acetone and gave a positive 2,4-dinitrophenylhydrazine test.

4-bromo-3-phenylcyclobutenedione

Three grams of phenylcyclobutenedione were dissolved in 15 ml. of glacial acetic acid containing 1 ml. of acetic anhydride and 3.03 grams of bromine were added. The solution was heated on a steam cone until it was pale yellow. Crystals of 4-bromo-3-phenylcyclobutenedione separated on cooling and after recrystallization from carbon tetrachloride melted at 128–129° C. Yield: 2.4 grams (53%).

Calculated for $C_{10}H_5O_2Br$: C, 50.66; H, 2.13. Found: C, 50.64; H, 2.13.

The bromodione reacted immediately with permanganate, gave a precipitate with alcoholic silver nitrate and reacted with 2,4-dinitrophenylhydrazine.

4-iodo-3-phenylcyclobutenedione 250 mg. of 4-bromo-3-phenylcyclobutenedione was dissolved in 10 ml. of dry acetone and treated with a solution of sodium iodide in acetone until precipitate no longer separated. The solution was filtered, the solvent removed in a stream of nitrogen and the residue crystallized from benzene to give 4-iodo-3-phenylcyclobutenedione having a melting point of 162.5–165.5° C., decomposing at this temperature.

Calculated for $C_{10}H_5O_2I$: C, 42.26; H, 1.77. Found: C, 42.38; H, 1.87.

4-methoxy-3-phenylcyclobutenedione 250 mg. of 4-bromo-3-phenylcyclobutenedione was dissolved in 10 ml. of absolute methanol and refluxed on a steam cone for ½ hour. Concentration of the solution furnished 140 mg. (71%) of 4-methoxy-3-phenylcyclobutenedione, melting point, 151–152.2° C.

Calculated for $C_{11}H_8O_3$: C, 70.21; H, 4.29. Found: C, 70.04; H, 4.09.

The methyl ether undergoes ready hydrolysis. 4-methoxy-3-phenylcyclobutenedione (23 mg.) was heated in 1 ml. of water until the solid dissolved whereupon the solvent was removed in a stream of nitrogen and the white crystalline residue crystallized from ether-benzene binary. The product, 4-hydroxy-3-phenylcyclobutenedione melted 200–205° C. (with decomposition). An infrared spectrum was identical with an authentic sample.

4-hydroxy-3-phenylcyclobutenedione

Phenylcyclobutenedione (1 g.) was dissolved in 15 ml. of glacial acetic acid and bromine (1 g.) was added dropwise. When the bromine color had faded and fumes of hydrogen bromide were evolved 5 ml. of water was added and the mixture heated to reflux for several minutes. Five ml. more was added and the solution heated as before. The solvent was removed in an air stream, the residue dissolved in ether and the product removed by continuous extraction with water. Concentration of the aqueous extract gave 0.9 g. (87%) of 4-hydroxy-3-phenylcyclobutenedione which was crystallized from ether-benzene, melting point 208–211° C. (with decomposition).

Calculated for $C_{10}H_6O_3$: C, 68.96; H, 3.48. Found: C, 68.87; H, 3.61.

The enol gave a dark red ferric chloride test, decolorized permanganate, could be recovered unchanged from 10% sodium hydroxide solution, reacted with 2,4-dinitrophenylhydrazine and formed a copper salt with cupric acetate.

4-amino-3-phenylcyclobutenedione

In a large test tube 4-bromo-3-phenylcyclobutenedione (250 mg.) was dissolved in 10 ml. of dry benzene and ammonia gas bubbled through the solution for one minute. The solvent was removed and the solid crystallized from dilute ethanol or acetic acid. The product, 150 mg. (82%), was a white crystalline solid, melting point 282–283° C.

Calculated for $C_{10}H_7O_2N$: C, 69.36; H, 4.07; N, 8.09. Found: C, 69.37; H, 4.04; N, 8.08.

The 4-amino-3-phenylcyclobutenedione is insoluble in the usual hydrocarbon solvents, sparingly soluble in 50% sulfuric acid and soluble in concentrated sulfuric acid. It does not give a ferric chloride test in dioxane and does not form a benzoyl derivative. The amino compound dissolved in 10% sodium hydroxide on slight warming. Ammonia was evolved and if the aqueous alkaline solution was neutralized, the solution gave a reddish coloration with ferric chloride indicating the presence of 4-hydroxy-3-phenylcyclobutenedione.

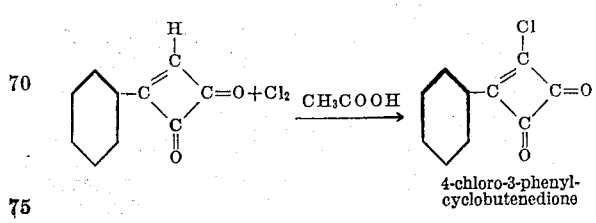

4-chloro-3-phenyl-cyclobutenedione

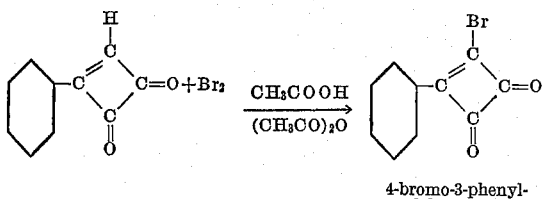

4-bromo-3-phenyl-
cyclobutenedione

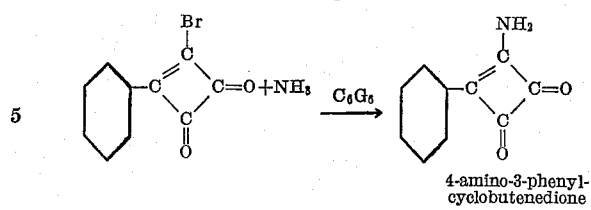

4-amino-3-phenyl-
cyclobutenedione

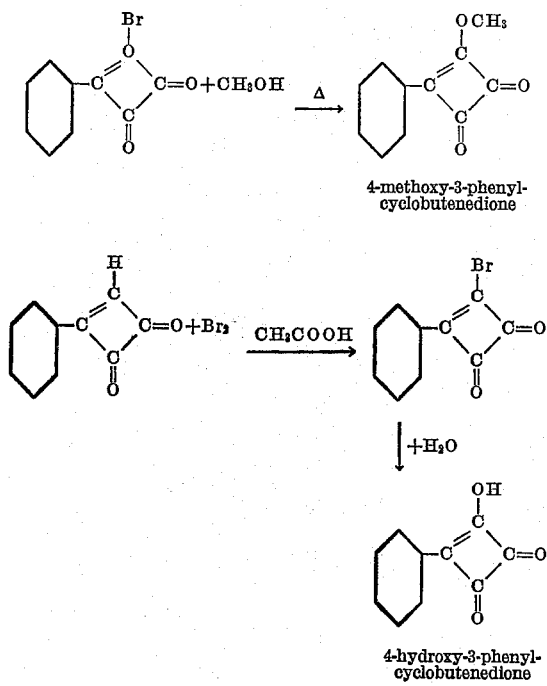

4-iodo-3-phenyl
cyclobutenedione 4-methoxy-3-phenyl-
cyclobutenedione 4-hydroxy-3-phenyl-
cyclobutenedione The halogenated derivatives may be hydrolyzed in the same manner as the methoxy derivative previously discussed.

Examination of a solution of 4-hydroxy-3-phenyl-cyclobutenedione shows that it is a stronger acid than the picric acid, having a $pK_a$ of 0.37 as compared to 0.7 for picric acid.

When rats infected with intestinal amebiasis were treated in vivo with phenylcyclobutenedione it was determined that the average degree of infection was reduced markedly. For example, a group of rats infected with intestinal amebiasis were given a diet containing 0.125% by weight of the dione for seven days. The average degree of infection was reduced from 3.3 for the control animals to 0.8 for the treated animals. In addition, the compound was determined to be active in vitro against both *E. histolytica* and *M. tuberculosis*.

As has been indicated above, when the dione is reacted with 30% hydrogen peroxide in chloroform, the principal reaction product is phenylmaleic anhydride. The dione, then, may be used advantageously in synthesizing this anhydride.

Other uses and advantages of these compounds and their method of preparation will be readily apparent to those skilled in the art.

We claim:

1. Phenylcyclobutenedione.

2. A method of preparing phenylcyclobutenedione comprising: reacting substantially equal molar quantities of phenylacetylene and a halogen-saturated ethylene and hydrolyzing the resulting intermediate with an excess of sulfuric acid.

3. A method of preparing phenylcyclobutenedione comprising: reacting substantially equal molar quantities of phenylacetylene and trifluorochloroethylene to form the halogen-substituted phenylcyclobutene, hydrolyzing the said halogen-substituted compound with an excess of sulfuric acid and isolating the resulting precipitate.

No references cited.